(12) United States Patent
Nagatomi

(10) Patent No.: US 9,925,630 B2
(45) Date of Patent: Mar. 27, 2018

(54) DEVICE FOR HOLDING WORKPIECE AND MACHINE TOOL

(71) Applicant: FANUC CORPORATION, Yamanashi (JP)

(72) Inventor: Takashi Nagatomi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 159 days.

(21) Appl. No.: 14/803,327

(22) Filed: Jul. 20, 2015

(65) Prior Publication Data

US 2016/0023315 A1    Jan. 28, 2016

(30) Foreign Application Priority Data

Jul. 25, 2014  (JP) ................. 2014-151989

(51) Int. Cl.
  *B25B 1/00* (2006.01)
  *B23Q 3/06* (2006.01)
  *B23Q 1/54* (2006.01)

(52) U.S. Cl.
  CPC ............. *B23Q 3/069* (2013.01); *B23Q 1/545* (2013.01)

(58) Field of Classification Search
  USPC .................................. 269/92, 139, 157, 246
  See application file for complete search history.

(56) References Cited

U.S. PATENT DOCUMENTS 2,487,022 A * 11/1949 La Placa .................. B25B 5/105
  269/139
3,194,548 A *  7/1965 Zwick ....................... B25B 5/106
  269/10
3,436,072 A *  4/1969 Svenson .................. B25B 5/105
  269/94
3,691,788 A *  9/1972 Mazziotti ............ B25B 23/0014
  16/224
4,140,307 A *  2/1979 Dalmau .................... B23Q 1/50
  269/71

FOREIGN PATENT DOCUMENTS

JP    2011513077 A    4/2011
WO    2009106268 A2   2/2009

OTHER PUBLICATIONS

English Machine Translation for Japanese Publication No. 2011-513077, published Apr. 28, 2011, 12 pgs.

* cited by examiner

*Primary Examiner* — Joseph J Hail
*Assistant Examiner* — Shantese McDonald
(74) *Attorney, Agent, or Firm* — Fredrikson & Byron, P.A.

(57) ABSTRACT

Provided is a device that prevents a workpiece from sticking to a clamp part and moving with the clamp part to a position deviating from a predetermined position. The device for holding the workpiece includes: a seat on which the workpiece is seated; a clamper that is movable with respect to the seat; a clamp part that is movably supported by the clamper and is configured to hold the workpiece at a clamp position with respect to the clamper in such a manner that the clamp part is pressed against the workpiece by an operation of the clamper so that the workpiece is held between the clamp part and the seat; and a biasing part that is configured to bias the clamp part to move the clamp part from the clamp position when the clamp part is at the clamp position.

6 Claims, 12 Drawing Sheets

DEVICE FOR HOLDING WORKPIECE AND MACHINE TOOL

BACKGROUND ART

1. Field of the Invention

The invention relates to a device for holding a workpiece, and a machine tool.

2. Description of the Related Art

Some conventional machine tools comprise a device for holding a workpiece including a seat on which the workpiece is placed and a clamp part movably disposed above the seat, wherein the workpiece is held between the seat and the clamp part (Japanese Laid-open Patent Publication No. 2011-513077, for example).

According to prior art, after processing the workpiece, the machine tool moves the clamp part away from the seat so as to release the workpiece from being held by the clamp part and the seat. At this time, it is possible that the workpiece may stick to the clamp part and moves together with the clamp part, and thus deviate from a predetermined position. This can disturb an operation such as one for changing workpieces.

SUMMARY OF THE INVENTION

In an aspect of the invention, a device for holding a workpiece comprises a seat on which a workpiece is seated; a clamper which is movable with respect to the seat; a clamp part which is movably supported by the clamper, which is pressed against the workpiece by an operation of the clamper so as to be arranged at a clamp position with respect to the clamper, and which holds the workpiece between the clamp part and the seat; and a biasing part which biases the clamp part so as to move from the clamp position when the clamp part is arranged at the clamp position.

The biasing part may be elastically deformed to bias the clamp part when the biasing part is arranged at the clamp position. The biasing part may include a spring. The biasing part may include an annular first portion attached to the clamper so as to surround the clamper, and a second portion extending from the first portion so as to be connected to the clamp part.

The second portion may annularly extend so as to surround the clamp part. The central axis of the inner periphery of the second portion does not coincide with the central axis of the first portion. The seat may include an engagement part which engages the workpiece so as to prevent the workpiece from moving relative to the seat.

In another aspect of the invention, a machine tool comprises the above-mentioned device.

BRIEF DESCRIPTION OF THE DRAWINGS

The invention will further clearly be understood in terms of the aforementioned object, another object, a feature and a merit thereof by the following embodiments with reference to the attached drawings, in which.

DETAILED DESCRIPTION OF THE INVENTION

Figure 1:
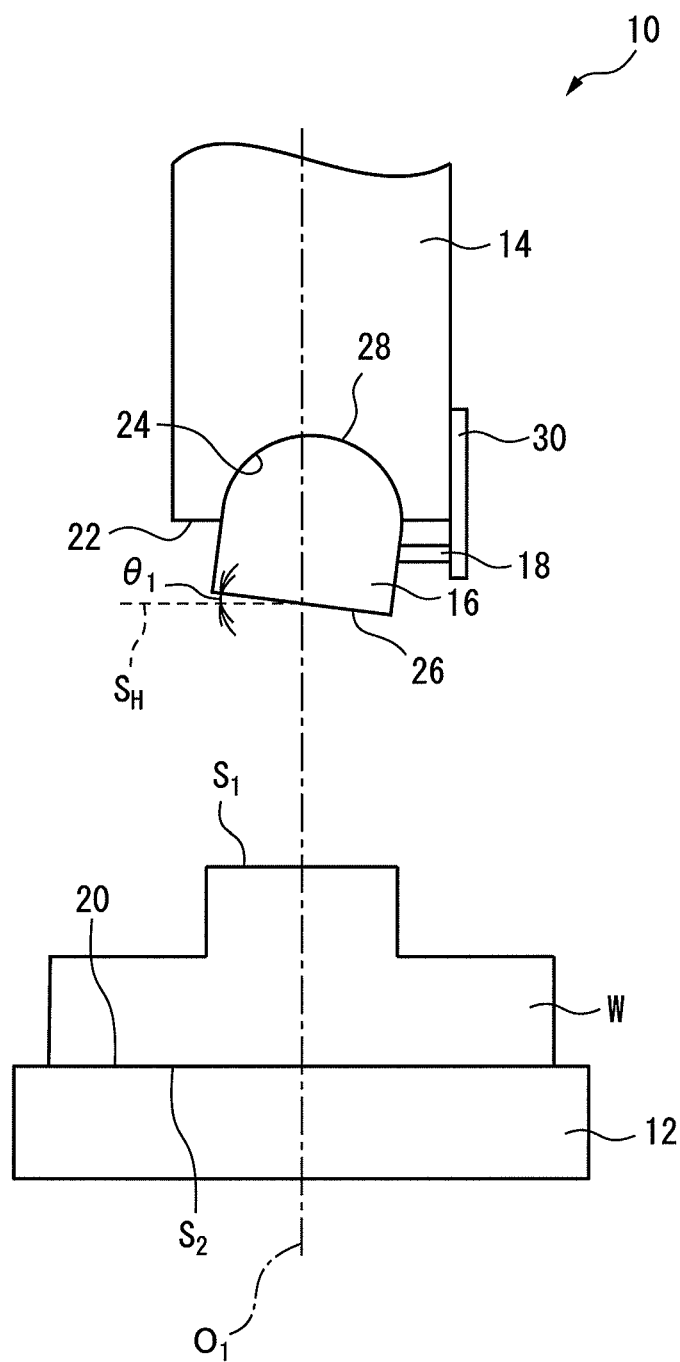
FIG. 1 is a side view of an embodiment of a device according to the invention.

Embodiments of the invention will be described below with reference to the drawings. First, referring to FIG. 1, a device 10 according to an embodiment of the invention will be described. It should be noted that, in the following description, the upward (upper direction) corresponds to the upward (upper direction) in FIG. 1.

Further, the radial direction indicates the direction of a radius of a circle centered about the axis $O_1$ (or $O_3$) extending in the vertical direction. The axial direction indicates a direction along the axis $O_1$ (or $O_3$). Further, in a variety of embodiments described below, similar elements are assigned the same reference numerals, and detailed descriptions thereof will be omitted.

The device 10 is installed in a machine tool, for example, and configured to hold a workpiece W. In the present embodiment, the workpiece W is a member having a T-shape cross section, and has a flat upper surface $S_1$ and a flat lower surface $S_2$. The upper surface $S_1$ and the lower surface $S_2$ is arranged to be orthogonal to the axis $O_1$. The device 10 includes a seat 12, a clamper 14, a clamp part 16, and a biasing part 18.

The seat 12 is a member for supporting the workpiece W from downward. The workpiece W is seated on an upper surface 20 of the seat 12. In the present embodiment, the upper surface 20 of the seat 12 is flat surface orthogonal to the axis $O_1$. During processing, the workpiece W is placed on the upper surface 20 of the seat 12 so as to be centered about the axis $O_1$.

The clamper 14 extends along the vertically-extending axis $O_1$. The clamper 14 is moved along the axis $O_1$ by a clamper drive unit (not shown) comprised of e.g. a servomotor, in the directions toward and away from the seat 12. A lower end surface 22 of the clamper 14 is formed with a recessed surface 24 recessed inward from the lower end surface 22. The recessed surface 24 is e.g. a curved surface such as a semispherical surface.

The clamp part 16 is movably supported by the clamper 14 at the lower end of the clamper 14. The clamp part 16 has a press surface 26 at the lower end thereof and a convex surface 28 at the upper end thereof. In the present embodiment, the press surface 26 is a flat surface. On the other hand, the convex surface 28 is a curved surface, such as a semispherical surface, which has a shape corresponding to the recessed surface 24 of the clamper 14.

The convex surface 28 of the clamp part 16 and the recessed surface 24 of the clamper 14 are arranged to face each other so that the convex surface 28 can slide relative to the recessed surface 24. The convex surface 28 and the recessed surface 24 constitute an adjustable joint (universal joint). Thus, the clamp part 16 is supported at the lower end of the clamper 14 via the universal joint comprised of the convex surface 28 and the recessed surface 24, so as to be able to rotate in a direction along the convex surface 28 and the recessed surface 24.

The biasing part 18 is arranged so that one end thereof is connected to a support 30 fixed to the clamper 14, and the other end thereof is connected to the clamp part 16. The biasing part 18 is made of e.g. an elastic material. When the clamp part 16 is separated away from the workpiece W as shown in FIG. 1, the biasing part 18 holds the clamp part 16 so that the press surface 26 of the clamp part 16 is slanted with respect to the upper surface $S_1$ of the workpiece W.

More specifically, by the biasing part 18, the press surface 26 of the clamp part 16 is held so as to be slanted with respect to an imaginary horizontal surface $S_H$ orthogonal to the axis $O_1$ (i.e., an imaginary flat surface parallel to the upper surface $S_1$ of the workpiece W) by a degree $\theta_1$. Such arrangement of the clamp part 16 relative to the clamper 14 is referred to as a "non-clamp position".

Next, referring to FIGS. 1 to 5, the operation of the device 10 according to the present embodiment will be described. As described above, the device 10 holds the workpiece W at a predetermined position in order to machine the workpiece W. When holding the workpiece W by the device 10, the clamper 14 is firstly moved downward from the position shown in FIG. 1 toward the seat 12 by the above clamper drive unit.

Figure 2:
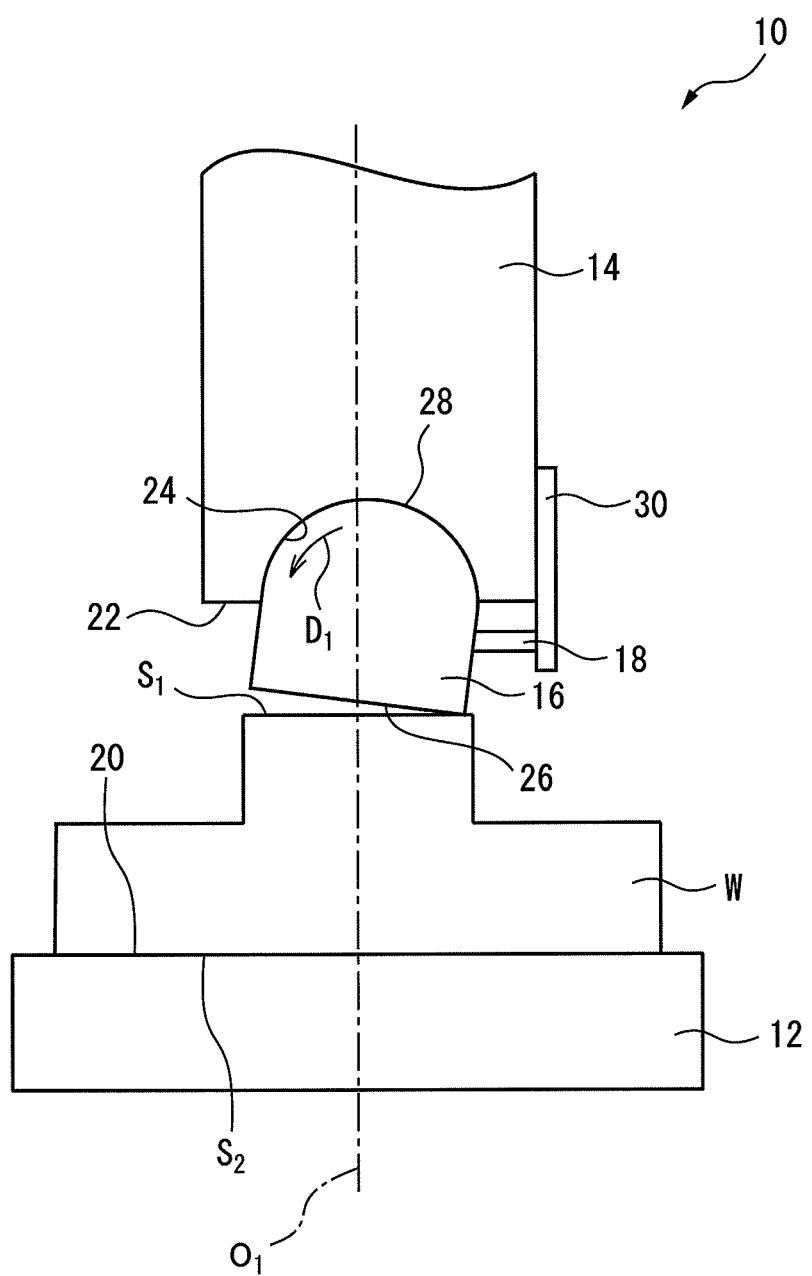
FIG. 2 shows the device in FIG. 1, wherein the clamper is moved downward, whereby the clamp part contacts the workpiece.

As a result, a part of the press surface 26 of the clamp part 16 contacts the upper surface $S_1$ of the workpiece W, as shown in FIG. 2. As the clamper 14 is further moved downward from the position shown in FIG. 2, the clamp part 16 rotates relative to the clamper 14 in the direction along the convex surface 28 and the recessed surface 24, as indicated by arrow $D_1$ in FIG. 2.

Figure 3:
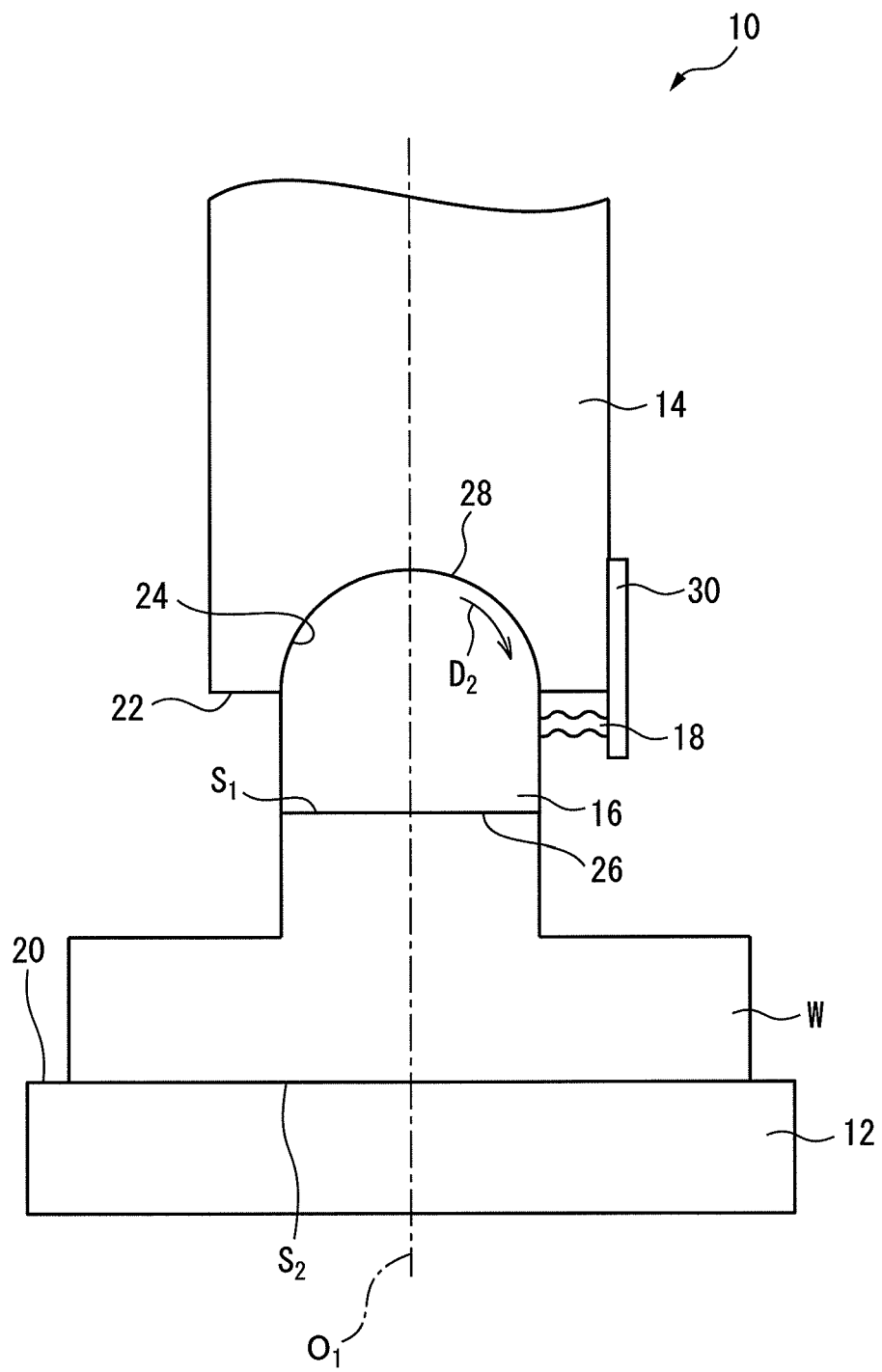
FIG. 3 shows the device in FIG. 2, wherein the clamper is further moved downward from the position shown in FIG. 2 so that the clamp part is pressed against the workpiece, whereby the workpiece is held between the clamp part and the seat.

Then, as shown in FIG. 3, the press surface 26 of the clamp part 16 is pressed against the upper surface $S_1$ of the workpiece $S_1$, whereby the press surface 26 and the upper surface $S_1$ come into surface-contact with each other. Thus, the clamp part 16 is pressed against the workpiece W by the operation of the clamper 14, whereby the workpiece W is firmly sandwiched between the clamp part 16 and the seat 12.

At this time, the clamp part 16 is arranged at a "clamp position" with respect to the clamper 14, which is different from the non-clamp position shown in FIG. 1. More specifically, when the clamp part 16 is arranged at the clamp position, the press surface 26 thereof is arranged parallel to the upper surface $S_1$ of the workpiece W (i.e., the press surface 26 is arranged orthogonal to the axis $O_1$).

When the clamp part 16 is arranged at the clamp position, the biasing part 18 is elastically deformed and applies a reactive elastic force to the clamp part 16. Due to this, the clamp part 16 is biased so as to rotate in a direction indicated by the arrow $D_2$ in FIG. 3 opposite to the direction of the arrow $D_1$ in FIG. 2. The machining process is performed on the workpiece W when the workpiece W is held by the device 10 as stated above.

If the workpiece W is held between the clamp part 16 and the seat 12 with a strong force, the upper surface $S_1$ of the workpiece W and the press surface 26 of the clamp part 16 may stick to each other. Below, a case is described where the upper surface $S_1$ and the press surface 26 have stuck to each other during processing of the workpiece W in this embodiment.

After completing the process on the workpiece W, the clamper 14 is moved upward so as to be separated from the seat 12. At this time, if the sticking force between the upper surface $S_1$ of the workpiece W and the press surface 26 becomes greater than the sticking force between the lower surface $S_2$ of the workpiece W and the upper surface 20 of the seat 12, the workpiece W is also moved upward together with the clamp part 16.

According to the present embodiment, the clamp part 16 is biased by the biasing part 18 so as to rotate in the direction indicated by the arrow $D_2$ in FIG. 3. Therefore, when the clamp part 16 and the workpiece W move in the direction away from the seat 12, the clamp part 16 and the workpiece W tend to rotate in the direction of the arrow $D_2$.

However, the rotational movement of the workpiece W is restricted, since the lower surface $S_2$ of the workpiece W contacts the upper surface 20 of the seat 12. Thus, the clamp part 16 intends to rotate under the action of the biasing part 18 while the rotational movement of the workpiece W is restricted, whereby a shearing force (i.e., a force for moving the press surface 26 relative to the upper surface $S_1$) is generated between the upper surface $S_1$ of the workpiece W and the press surface 26.

Figure 4:
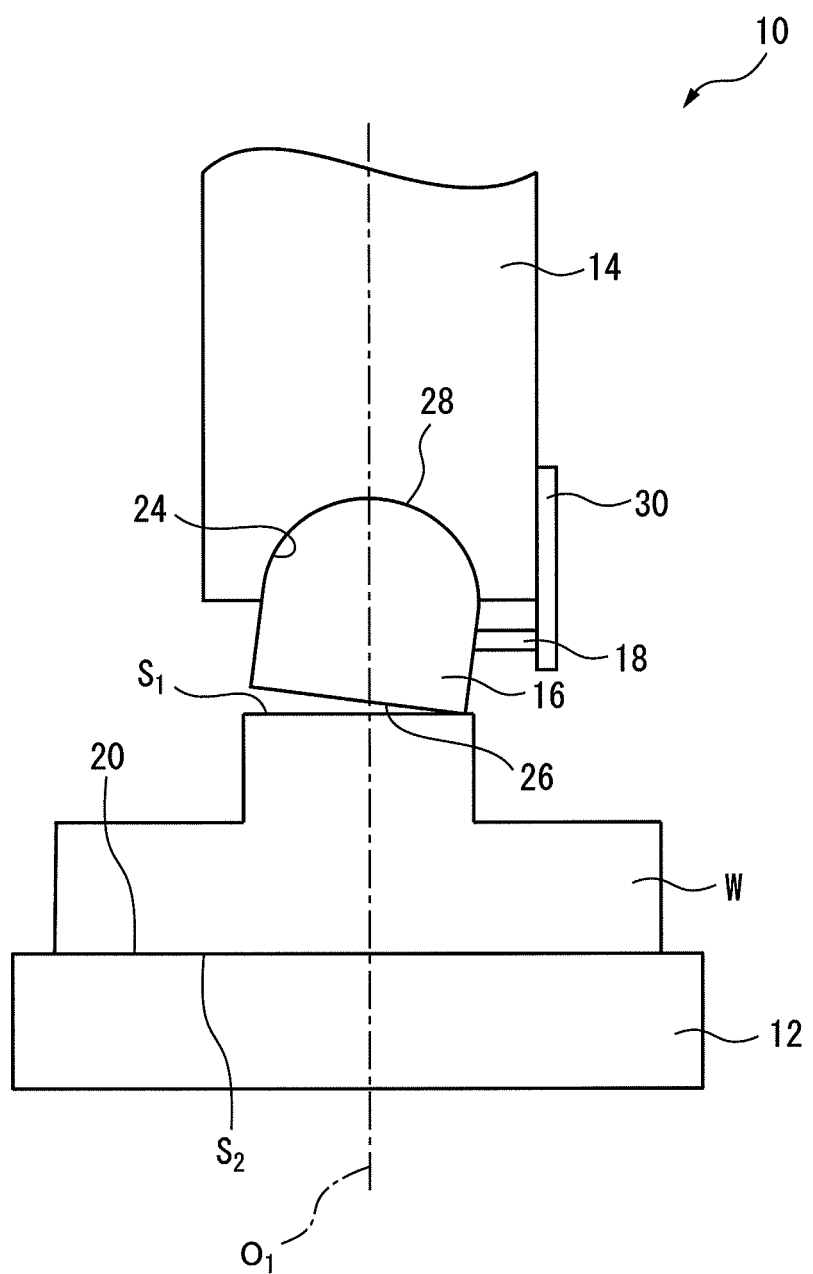
FIG. 4 shows the device in FIG. 3, wherein the clamper is moved upward from the position shown in FIG. 3, whereby the clamp part slightly separates from the workpiece.
Figure 5:
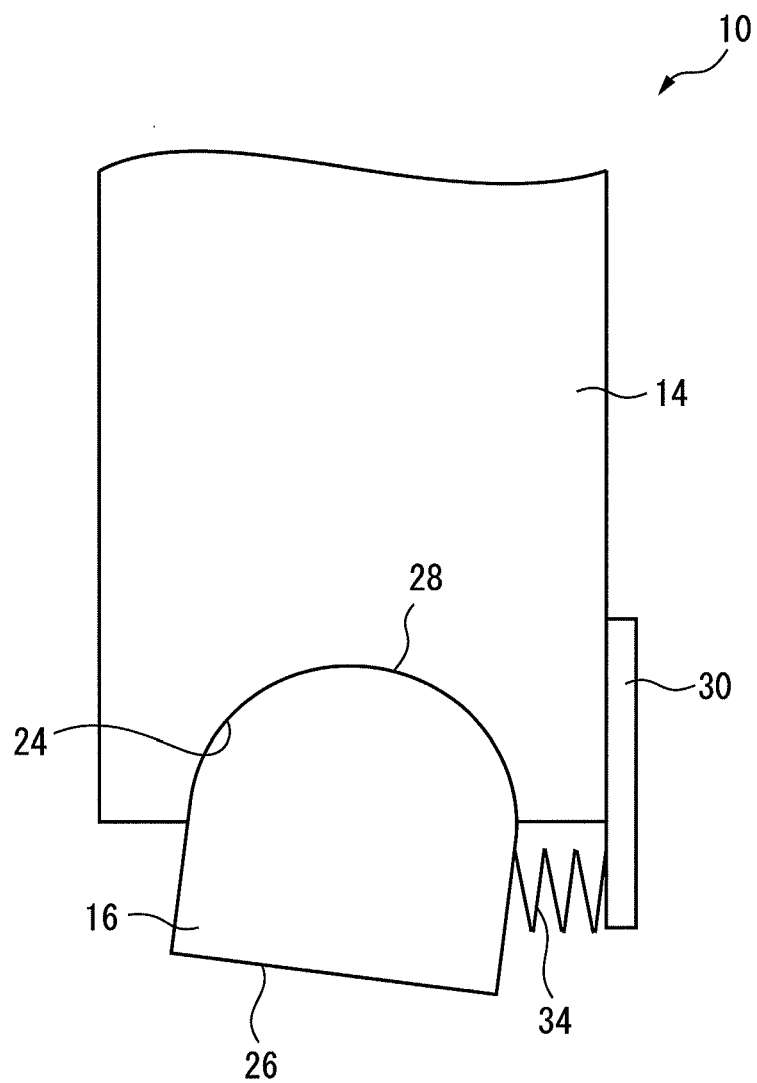
FIG. 5 is a view of a biasing part according to another embodiment of the invention.

If such shearing force becomes greater than the sticking force between the upper surface $S_1$ of the workpiece W and the press surface 26, the clamp part 16 is separated from the workpiece W as shown in FIG. 4. Then, the clamper 14 is further moved upward, along with which the clamp part 16 is also moved upward. As a result, the clamper 14 is completely separated away from the workpiece W as shown in FIG. 1.

On the other hand, if the sticking force between the upper surface $S_1$ of the workpiece W and the press surface 26 is less than the sticking force between the lower surface $S_2$ of the workpiece W and the upper surface 20 of the seat 12, as the clamp part 16 is moved upward, the workpiece W is held on the seat 12, whereby the clamp part 16 is separated away from the workpiece W.

Thus, according to the present embodiment, the clamp part 16 is biased by the biasing part 18, as a result of which it is possible to smoothly separate the workpiece W from the clamp part 16 when the clamp part 16 is moved away from the seat 12 with the clamp part 16 sticking to the workpiece W. Therefore, it is possible to prevent the workpiece W from being lifted up by the clamp part 16 and deviating from a predetermined position, when the clamp part 16 is moved upward.

It should be noted that the biasing part 18 may have various configurations. Next, referring to FIG. 5, an embodiment of the biasing part 18 will be described. In the embodiment shown in FIG. 5, the biasing part 18 is comprised of a spring 34. The spring 34 is a compression spring, one end of which is connected to the support 30, and the other end of which is connected to the clamp part 16.

The spring 34 is compressed when the clamp part 34 is arranged at the clamp position so as to apply a reactive elastic force to the clamp part 16. As a result, the clamp part 16 is biased to rotate in one direction.

Figure 6:
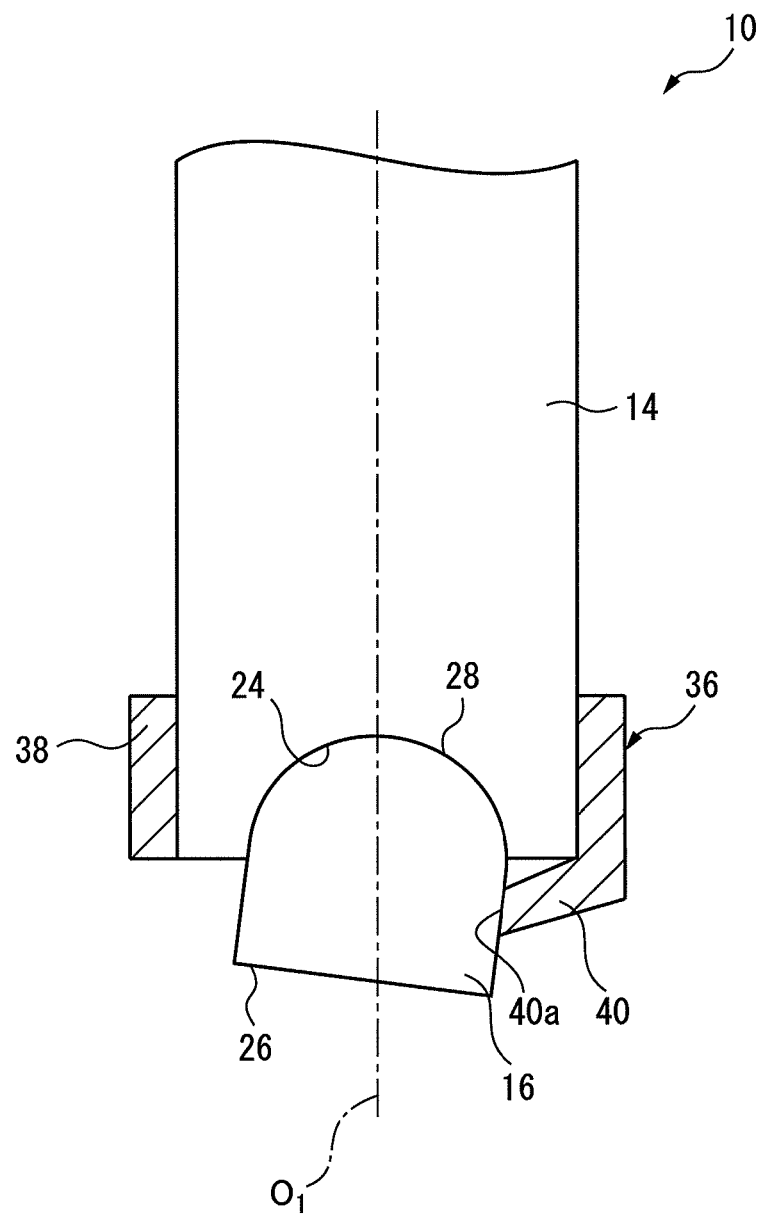
FIG. 6 is a side cross sectional view of a biasing part according to still another embodiment of the invention.
Figure 7:
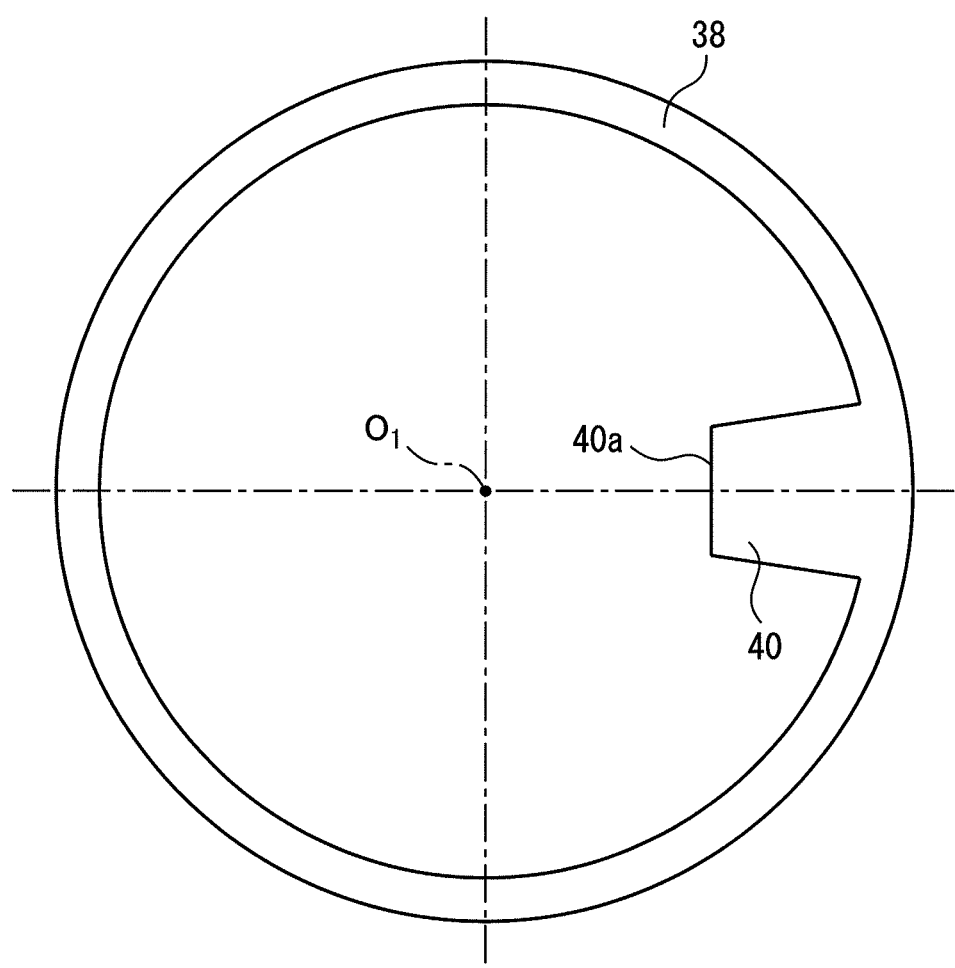
FIG. 7 is a bottom view of the biasing part shown in FIG. 6 when viewed from the bottom side thereof.

Next, referring to FIGS. 6 and 7, a biasing part 36 according to still another embodiment will be described. The biasing part 36 includes an annular first portion 38 and a platy second portion 40. The first portion 38 is attached to the outer periphery of the clamper 14 so as to surround the clamper 14. Accordingly, the central axis of the first portion 38 substantially coincides with the axis $O_1$.

The second portion 40 projects from the lower end of the first portion 38 toward radially inside so that the distal end 40a of the second portion 40 is connected to the clamp part 16. According to the biasing part 36, when the clamp part 16 is arranged at the clamp position, the second portion 40 is mainly deformed, whereby a reactive elastic force is applied to the clamp part 16. As a result, the clamp part 16 is biased to rotate in one direction.

Figure 8:
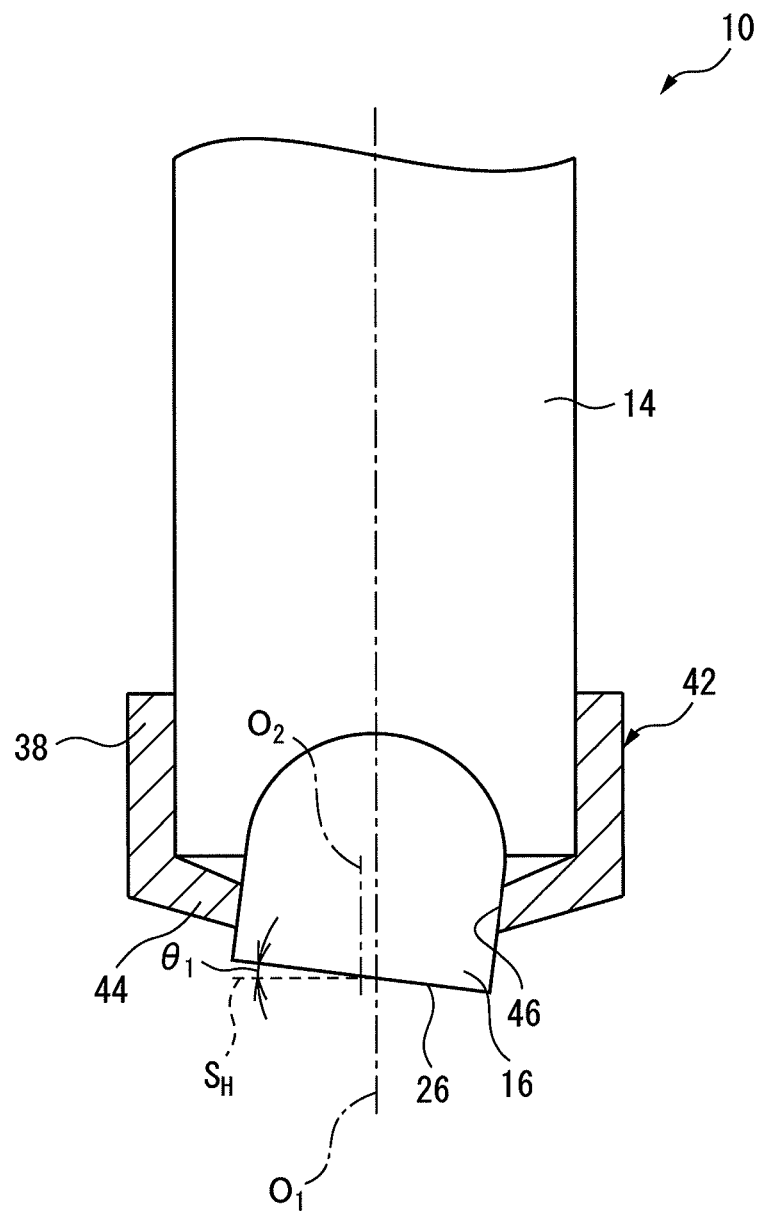
FIG. 8 is a side cross sectional view of a biasing part according to still another embodiment of the invention.
Figure 9:
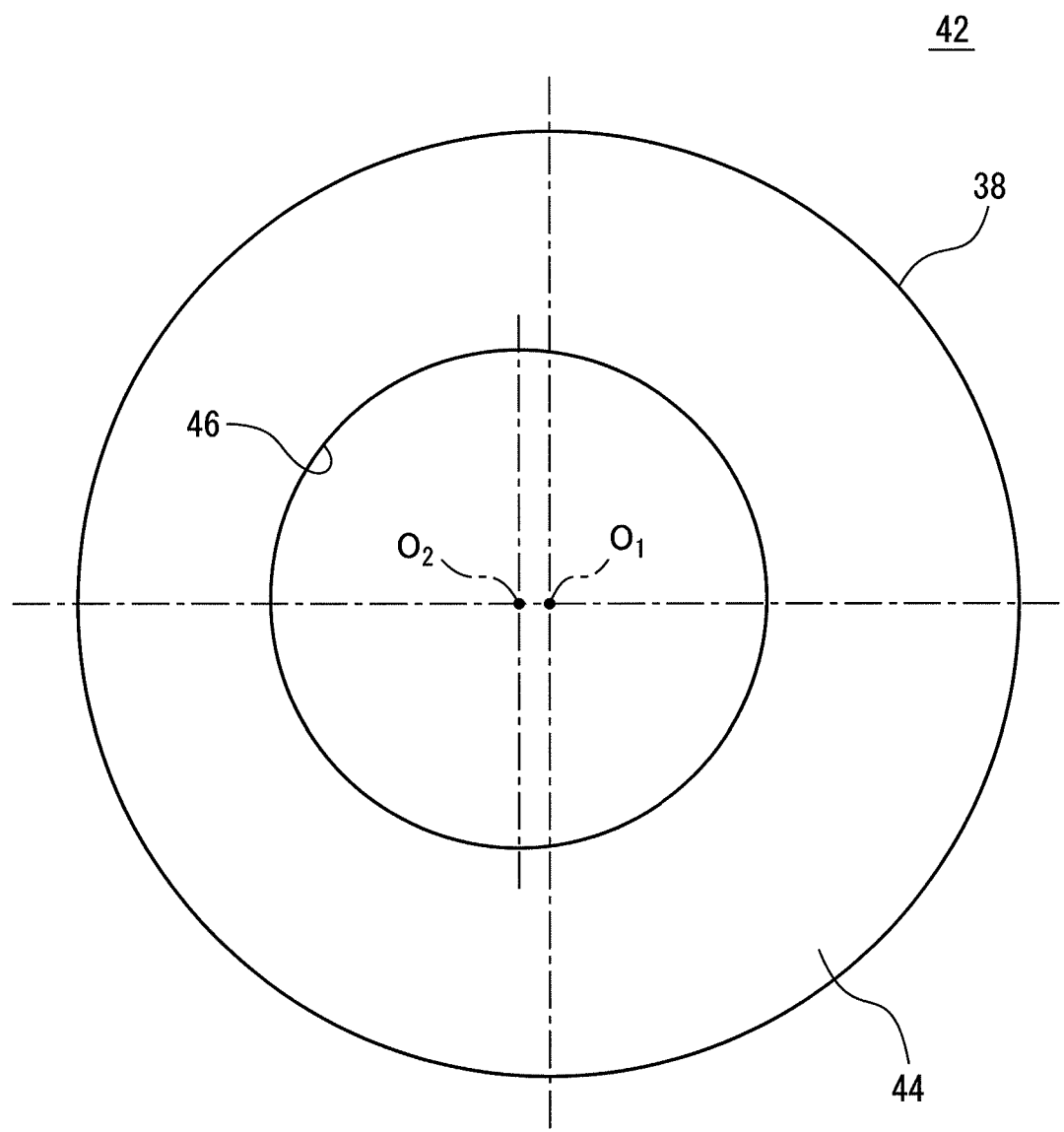
FIG. 9 is a bottom view of the biasing part shown in FIG. 8 when viewed from the bottom side thereof.

Next, referring to FIGS. 8 and 9, a biasing part 42 according to still another embodiment will be described. The biasing part 42 includes a first portion 38 similar to the embodiment shown in FIG. 6, and an annular second portion 44.

The second portion 44 extends from the lower end of the first portion 38 toward radially inside, and annularly extends so as to surround the clamp part 16. The second portion 44 has an annular inner periphery 46 extending so as to surround the axis $O_1$. The second portion 44 is connected to the clamp part 16 at its inner periphery 46.

Here, the central axis $O_2$ of the inner periphery 46 is disposed so as to be separated from the axis $O_1$. Due to this configuration, the clamp part 16 is held so that the press surface 26 is slanted with respect to the imaginary horizontal surface $S_H$ by the angle $\theta_1$. In this way, the clamp part 16 is arranged at the non-clamp position by the biasing part 42.

According to the biasing part 42, when the clamp part 16 is arranged at the clamp position, the second portion 44 is mainly deformed, whereby a reactive elastic force is applied to the clamp part 16. As a result, the clamp part 16 is biased so as to rotate in one direction.

Figure 10:
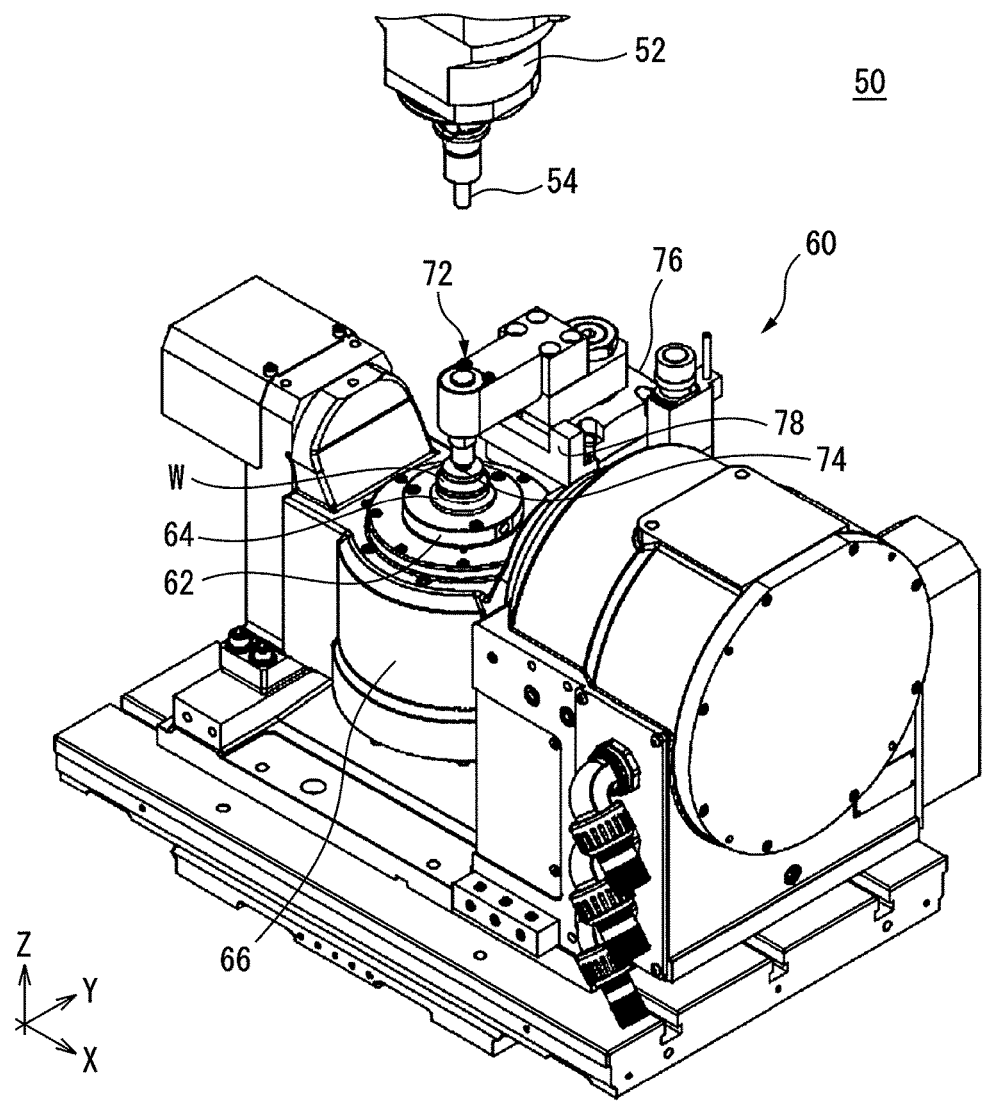
FIG. 10 is a perspective view of a machine tool according to an embodiment of the invention.
Figure 11:
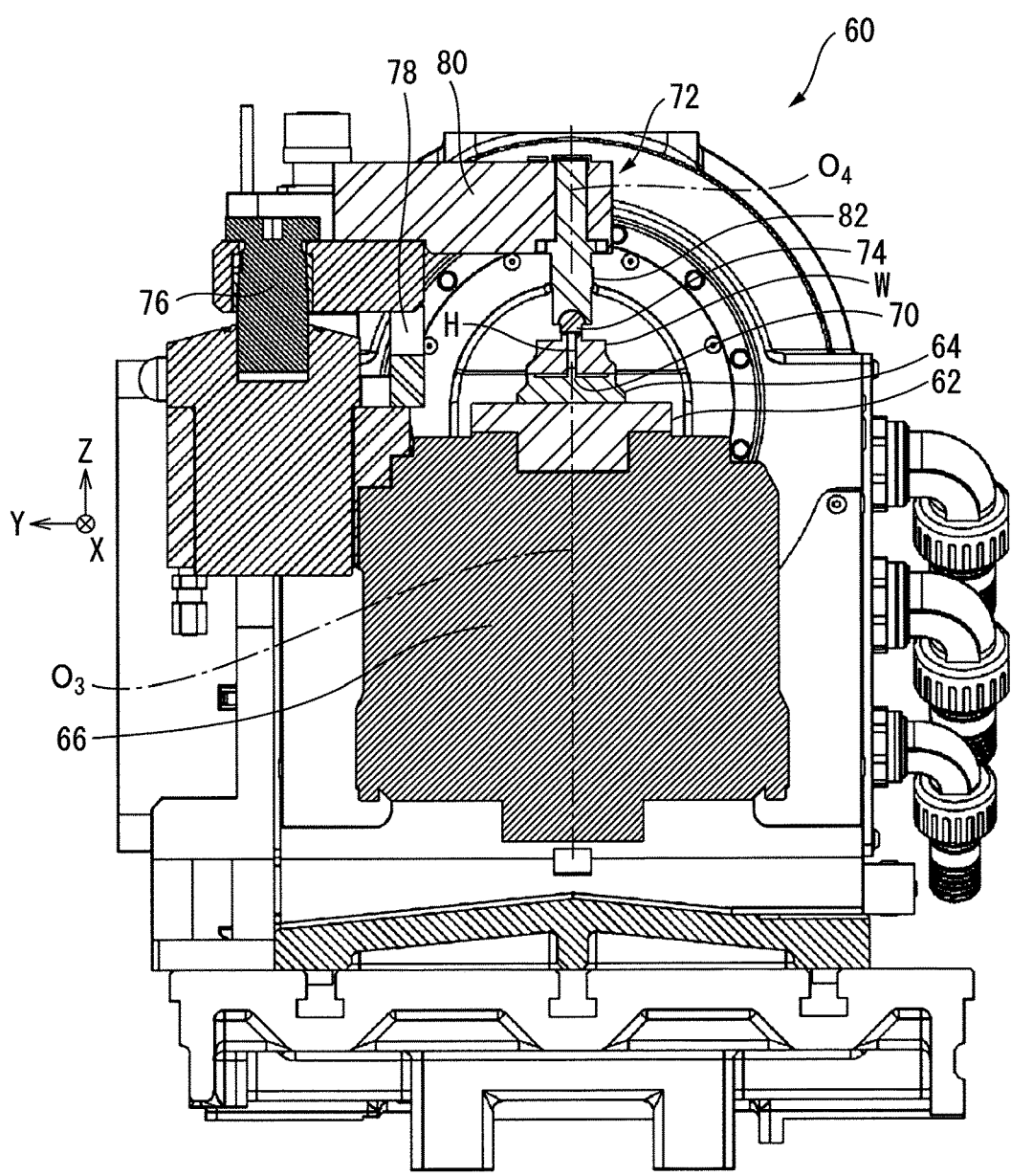
FIG. 11 is a side cross sectional view of the machine tool shown in FIG. 10.

Next, referring to FIGS. 10 to 12, a machine tool 50 according to an embodiment of the invention will be described. It should be noted that the Z-axis direction in FIGS. 10 and 11 is parallel to an axis $O_3$ described later (i.e., a vertical direction). Further, the X-axis direction in FIGS. 10 and 11 is a horizontal direction orthogonal to the Z-axis. In addition, the Y-axis direction in FIGS. 10 and 11 is a horizontal direction orthogonal to both the Z-axis and the X-axis.

The machine tool 50 is so-called a turntable type machine tool, and includes a spindle head 52 and a device 60 for holding a workpiece W. The spindle head 52 is moved in the Z-axis direction in FIG. 10 by a drive means such as a servomotor, etc.

The spindle head 52 is configured to hold a cutting tool 54 including various type of cutting tools such as an end mill. The machine tool 50 machines the workpiece W into a desired shape by moving the cutting tool 54 relative to the workpiece W held by the device 60.

The device 60 includes a worktable 62 rotatable about an axis $O_3$, a seat 64 disposed on the worktable 62, and a rotary drive part 66 disposed below the worktable 62. The rotary drive part 66 is comprised of a servomotor of various types, and rotates the worktable 62 and the seat 64 disposed on the worktable 62 about the axis $O_3$, with an instructed rotation speed and to an instructed rotation position.

The workpiece W of the present embodiment has a circular disk shape including a center hole H penetrating the workpiece W. The seat 64 has a circular disk shape of a size corresponding to the workpiece W. The workpiece W is seated on the upper surface 68 (FIG. 12) of the seat 64.

The upper surface 68 of the seat 64 is formed with a positioning projection 70 centered about the axis $O_3$. The positioning projection 70 is inserted into the center hole H of the workpiece W so as to engage the center hole H, whereby preventing the workpiece W from moving in the radial direction relative to the seat 64.

Thus, the positioning projection 70 functions as an engagement part for preventing the workpiece W from moving relative to the seat 64. By the positioning projection 70, the workpiece W is positioned to be centered about the axis $O_3$.

The device 60 includes a clamper 72 capable of moving relative to the seat 64, a clamp part 74 movably supported by the clamper 72, a linear drive part 76 for moving the clamper 72 in the axial direction, and a guide 78 for guiding the clamper 72. The linear drive part 76 is comprised of a linear motion actuator of various types. A movable part of the linear drive part 76 is connected to the proximal end of the clamper 72.

The clamper 72 includes an arm 80 extending parallel to the upper surface of the worktable 62, and a projecting part 82 disposed so as to project from the distal end of the arm 80 toward the seat 64. The projecting part 82 is attached to the arm 80 so as to be able to rotate about an axis $O_4$. The axis $O_4$ substantially coincides with the axis $O_3$.

The clamp part 74 is supported at the distal end of the projecting part 82 and rotates together with the projecting part 82 when the projecting part 82 rotates about the axis $O_4$. As shown in FIG. 12, the clamp part 74 has a convex surface 84 at the upper end thereof and a press surface 90 at the lower end thereof. On the other hand, the lower end surface 86 of the projecting part 82 is formed with a recessed surface 88 which is recessed inward from the lower end surface 86.

The convex surface 84 and the recessed surface 88 are arranged to face each other so that the convex surface 84 can slide relative to the recessed surface 88. The convex surface 84 and the recessed surface 88 constitute an adjustable joint (universal joint). Thus, the clamp part 74 is supported at the lower end of the projecting part 82 via the universal joint comprised of the convex surface 84 and the recessed surface 88, so as to be able to rotate in a direction along the convex surface 84 and the recessed surface 88.

Similar to the above-mentioned clamp part 16, the clamp part 74 holds the workpiece W between the seat 64 and the clamp part 74. More specifically, the clamp part 74 is pressed against the workpiece W as the clamper 72 is moved toward the seat 64 by the linear drive part 76.

Figure 12:
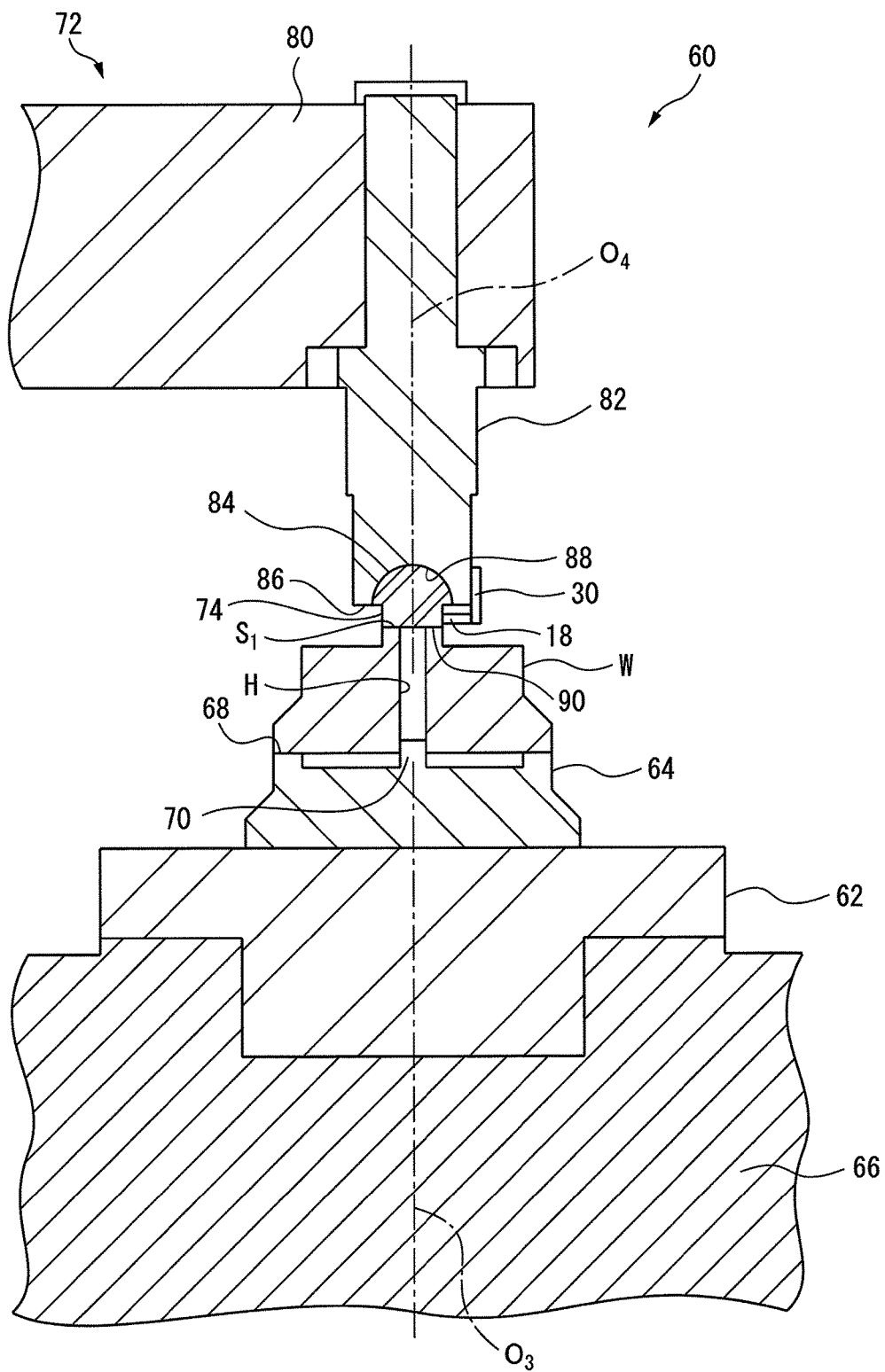
FIG. 12 is an enlarged cross sectional view of a part of the machine tool shown in FIG. 11.

As a result, the clamp part 74 is arranged at a clamp position with respect to the clamper 72 as shown in FIG. 12, and presses the workpiece W against the seat 64. Whereby, the workpiece W is firmly held between the clamp part 74 and the seat 64. When the clamp part 74 is arranged at the clamp position as shown in FIG. 12, the press surface 90 of the clamp part 74 is parallel to the upper surface $S_1$ of the workpiece W (i.e., the press surface 90 is orthogonal to the axis $O_3$).

The device 60 includes a biasing part 18 similar to the above-mentioned embodiment. The biasing part 18 is arranged so that one end thereof is connected to a support 30 fixed to the projecting part 82, and the other end thereof is connected to the clamp part 74.

When the clamp part 74 is arranged at the clamp position, the biasing part 18 is elastically deformed, whereby an elastic force is applied to the clamp part 74. On the other hand, when the clamp part 74 is apart from the workpiece W, the biasing part 18 holds the clamp part 74 so that the press surface 90 of the clamp part 74 is slanted with respect to the upper surface $S_1$ of the workpiece W (i.e., at a non-clamp position).

According to the present embodiment, it is possible to smoothly separate the workpiece W from the clamp part 74 when the clamp part 74 is moved away from the seat 64 with the clamp part 74 sticking to the workpiece W, by the action of the biasing part 18 on the basis of same principle as the above embodiment in FIGS. 3 and 4. Therefore, it is possible to prevent the workpiece W from being lifted up by the clamp part 74 and deviated from a predetermined position, when the clamp part 74 is moved upward.

Further, according to the present embodiment, the positioning projection 70 formed at the seat 64 prevents the workpiece W from moving relative to the seat 64. Due to this, the rotational movement of the workpiece W can be effectively restricted, when the clamp part 74 is moved away from the seat 64 so that the clamp part 74 and the workpiece W intend to rotate by the action of the biasing part 18. Accordingly, it is possible to successfully separate the workpiece W from the clamp part 74 by the biasing part 18.

In the above embodiments, a case is described where the clamp part 16, 74 is supported by the clamper 14, 72 via the universal joint so as to be able to rotate. However, the clamp part 16 may be supported by the clamper 14 so as to be able to slide in the horizontal direction (e.g. the right-left direction) in FIG. 1 (i.e., to slide along a plane orthogonal to the axis $O_1$), for example. In this case, the biasing part 18 may be arranged to bias the clamp part 16 in one horizontal direction (e.g. the left direction) in FIG. 1.

In such embodiment, the clamp part may be arranged relative to the clamper 14 as shown in FIG. 3 when arranged at the "clamp position", while the clamp part may be arranged at a position separated e.g. leftward from the position in FIG. 3 when arranged at the "non-clamp position".

In this embodiment, when pressing the clamp part against the workpiece W to hold the workpiece W, the user may move the clamp part from the non-clamp position to the clamp position against the biasing force of the biasing part 18, manually or by a servo motor, for example.

In this embodiment, when the clamp part is moved away from the seat 12 by the clamper 14 after processing on the workpiece W, the clamp part tends to move in the one horizontal direction (e.g., the left direction) in FIG. 1 by the action of the biasing part 18. On the other hand, the movement of the workpiece W relative to the seat 12 may be restricted by e.g. an engagement part such as the above positioning projection 70. Thus, in this embodiment, it is possible to generate a shearing force between the clamp part and the workpiece W so as to separate the workpiece W from the clamp part, similar as the above-mentioned embodiments.

Further, in the above embodiments, a case is described where the workpiece W has a T-shape cross section, and the upper surface $S_1$ and the lower surface $S_2$ thereof are orthogonal to the axis $O_1$. However, the device according to the invention can be configured to hold various types of workpieces other than the above T-shaped workpiece W.

The embodiments described above should not be considered to restrict the scope of the invention. In addition, any configurations including combinations of the features described in the embodiments are included in the technical scope of the invention, though not all the combinations are essential to the means to solve the problems in the invention. Moreover, it would be obvious to a person skilled in the art that the embodiments of the invention may be provided with various changes and modifications.

Moreover, an execution procedure of each processing such as an operation, process, step, course and stage in the device, system, program and method described in the claims, the description and the drawings may be carried out in any order of sequence, unless specified by "before", "prior to" or the like, and unless an output in a preceding process is used in a following process. An operation flow in the claims, the description and the drawings might include "first", "next", "then" or the like; however, such wordings do not mean to restrict any sequence in this order.

What is claimed is:

1. A device for holding a workpiece, comprising:
a seat on which the workpiece is seated;
a clamper movable relative to the seat;
a clamp part movably supported by the clamper, the clamp part having a planar, flat surface that is pressed against the workpiece by an operation of the clamper so as to be arranged at a clamp position with respect to the clamper and holding the workpiece between the clamp part and the seat; and
a biasing part coupled to the clamper and located adjacent to the clamp part which biases the clamp part by applying force in a direction parallel to the plane of the planar, flat surface of the clamp part when the clamp part is arranged in the clamped position so as to move the clamp part from its clamp position to a non-clamp position.

2. The device of claim 1, wherein the biasing part includes a spring.

3. The device of claim 1, wherein the seat includes an engagement part which engages the workpiece so as to prevent the workpiece from moving relative to the seat.

4. A machine tool comprising the device of claim 1.

5. A device for holding a workpiece, comprising:
a seat on which the workpiece is seated;
a clamper movable relative to the seat;
a clamp part movably supported by the clamper, the clamp part having a planar, flat surface that is pressed against the workpiece by an operation of the clamper so as to be arranged at a clamp position with respect to the clamper and holding the workpiece between the clamp part and the seat; and
a biasing part coupled to the clamper and located adjacent to the clamp part which biases the clamp part by applying force in a direction parallel to the plane of the planar, flat surface of the clamp part when the clamp part is arranged in the clamped position so as to move the clamp part from its clamp position to a non-clamp position wherein the biasing part is elastically deformed to bias the clamp part when the biasing part is arranged at the clamp position, wherein the biasing part includes:
an annular first portion attached to the clamper so as to surround the clamper; and
a second portion extending from the first portion so as to be connected to the clamp part.

6. A device for holding a workpiece, comprising:
a seat on which the workpiece is seated;
a clamper movable relative to the seat;
a clamp part movably supported by the clamper, the clamp part having a planar, flat surface that is pressed against the workpiece by an operation of the clamper so as to be arranged at a clamp position with respect to the clamper and holding the workpiece between the clamp part and the seat; and a biasing part coupled to the clamper and located adjacent to the clamp part which biases the clamp part by applying force in a direction parallel to the plane of the planar, flat surface of the clamp part when the clamp part is arranged in the clamped position so as to move the clamp part from its clamp position to a non-clamp position wherein the biasing part is elastically deformed to bias the clamp part when the biasing part is arranged at the clamp position, wherein a central axis of an inner periphery of the second portion does not coincide with a central axis of the first portion.

* * * * *